US007052795B2

(12) United States Patent
McLean et al.

(10) Patent No.: US 7,052,795 B2
(45) Date of Patent: *May 30, 2006

(54) COMPACT CHEMICAL REACTOR

(75) Inventors: Gerard Francis McLean, West Vancouver (CA); Duhane Lam, Vancouver (CA); Olen Vanderleeden, Coquitlam (CA)

(73) Assignee: Angstrom Power (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/818,780

(22) Filed: Apr. 6, 2004

(65) Prior Publication Data
US 2005/0220683 A1 Oct. 6, 2005

(51) Int. Cl.
*H01M 2/08* (2006.01)
*H01M 2/14* (2006.01)

(52) U.S. Cl. .......................... 429/34; 429/35; 429/36; 429/37; 429/38; 422/193

(58) Field of Classification Search ................ 422/193; 429/34, 35, 36, 37, 38
See application file for complete search history.

(56) References Cited

U.S. PATENT DOCUMENTS

| 3,634,140 A | 1/1972 | Von Krusenstierna .... 136/86 B |
| 5,252,410 A | 10/1993 | Wilkinson .................... 429/33 |
| 5,364,711 A | 11/1994 | Yamada ........................ 429/15 |
| 5,480,738 A | 1/1996 | Elangovan .................... 429/32 |
| 5,508,128 A | 4/1996 | Akagi .......................... 429/30 |
| 5,631,099 A | 5/1997 | Hockaday .................... 429/30 |
| 5,672,439 A | 9/1997 | Wilkinson ................... 429/40 |
| 5,759,712 A | 6/1998 | Hockaday .................... 429/30 |
| 5,861,221 A | 1/1999 | Ledjeff ......................... 429/32 |
| 5,925,477 A | 7/1999 | Ledjeff ......................... 429/32 |
| 5,989,741 A | 11/1999 | Bloomfield .................. 429/32 |
| 6,060,188 A | 5/2000 | Muthuswamy ............... 429/31 |
| 6,127,058 A | 10/2000 | Pratt ............................ 429/30 |
| 6,387,557 B1 | 5/2002 | Krasij .......................... 429/32 |
| 6,620,542 B1 | 9/2003 | Pan ............................. 429/41 |
| 6,740,444 B1 | 5/2004 | Leban ......................... 429/41 |
| 6,830,736 B1 * | 12/2004 | Lamla et al. ............... 422/211 |

FOREIGN PATENT DOCUMENTS

| CA | 2 273 316 | 11/1999 |
| CA | 2 396 191 | 9/2001 |
| CA | 2 438 733 | 8/2002 |
| CA | 2 484 294 | 11/2003 |

(Continued)

OTHER PUBLICATIONS

Wainwright, et al. "A Microfabricated Hydrogen/Air Fuel Cell" 195 Meeting of the Electrochemical Society, Seattle, WA ,1999.

*Primary Examiner*—Glenn Caldarola
*Assistant Examiner*—Alexis Wachtel
(74) *Attorney, Agent, or Firm*—Buskop Law Group, P.C.; Wendy Buskop

(57) ABSTRACT

The compact chemical reactor includes one or more unit reactors, a front reactant plenum, and a back reactant plenum. Each unit reactor is made of a front and back process layer, a front and back cavity, and a front and back perimeter barrier. The resulting assemblage is configured so the front cavity is in communication with the front side of the compact chemical reactor and the back cavity is in communication with the back side of the compact chemical reactor. The process layers facilitate an exchange of reactants between the reactant plenums.

50 Claims, 9 Drawing Sheets

FOREIGN PATENT DOCUMENTS

| | | |
|---|---|---|
| EP | 0585049 | 8/1993 |
| EP | 0 823 743 | 7/1997 |
| EP | 0823743 | 8/1997 |
| GB | 2339058 | 1/2000 |
| JP | 8050903 | 2/1996 |
| WO | PCT/US01/11763 | 12/2001 |
| WO | PCT/US02/00063 | 1/2002 |
| WO | PCT/US02/17434 | 6/2002 |

* cited by examiner

COMPACT CHEMICAL REACTOR

FIELD

The present embodiments relate to compact chemical reactors made of one or more unit reactors.

BACKGROUND

Layered, planar chemical reactors can be used for many tasks. One major problem with the layered planar chemical reactor is that the layers must be held in intimate electrical contact with each other. If the intimate contact does not occur, the internal resistance of the stack increases causing the overall efficiency of the chemical reactor to decrease.

A second problem with the layered planar chemical reactors is that larger surface areas increase the difficultly of maintaining consistent contact with the inner recesses of the layered planar chemical reactor.

Since both reactants are required to flow within the plane of the layered planar chemical reactor, at least four and up to six distinct layers have been required to form a workable cell. These layers are usually manufactured into two separate chemical reactors components. A chemical reactor stack is, then, formed by bringing layers into contact with each other. In forming the chemical reactor stack by contacting the layers, reactant flow must be allowed within the layers but reactants must not be allowed to leak from the assembled chemical reactor stack. The assembled stack usually has to be clamped together with significant force in order to activate perimeter seals and reduce losses associated with transport processes inherent in the reaction. Compressing layers together using brute force is inefficient and expensive.

A need has existed for a less expensive compact chemical reactor. A need has existed for a small compact chemical reactor capable of low cost manufacturing with fewer parts than the layered planar chemical reactor.

A need has existed for a small compact chemical reactor having the ability to utilize a wide variety of electrolytes. A need has existed for a compact chemical reactor capable of being easily scaled in micro dimensions.

A need has existed for a chemical reactor capable of being connected together without the need for external components for connecting the chemical reactors together. A need has existed for a compact chemical reactor with high aspect ratio cavities.

A need has existed to develop chemical reactors topologies or chemical reactor architectures that allow increased active areas to be included in the same volume, i.e., higher density of active areas. This will allow chemical reactors to be optimized in a manner different than being pursued by most chemical reactor developers today. The present embodiments meet that need.

SUMMARY

The compact chemical reactor has a central axis that includes one or more unit reactors, a front reactant plenum, and a back reactant plenum. At least a first unit reactor and a second unit reactor are disposed adjacent to each other to form a front side and a back side of the compact chemical reactor. The front reactant plenum communicates with the front side and a back reactant plenum communicates with the back side.

Each unit reactor is made of a front and back process layer, a front and back cavity, and a front and back perimeter barrier. The resulting assemblage is configured so the front cavity is in communication with the front side of the compact chemical reactor, and the back cavity is in communication with the back side of the compact chemical reactor. The process layers facilitate an exchange of reactants between the reactant plenums.

The compact chemical reactor can be attached to an electrical appliance. The compact chemical reactor can serve as a source of power for running an electrical appliance.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that it can be practiced or carried out in various ways.

The benefits of the compact chemical reactor described herein include increased reactant surface areas as compared to other compact chemical reactors. The compact chemical reactor also provides an ability to scale a compact chemical reactor to micro dimensions to create very small micro reactors.

The compact chemical reactor was designed to enable users to scale up the compact chemical reactor to larger sizes without the need for external components to hold the compact chemical reactor together.

Figure 1:
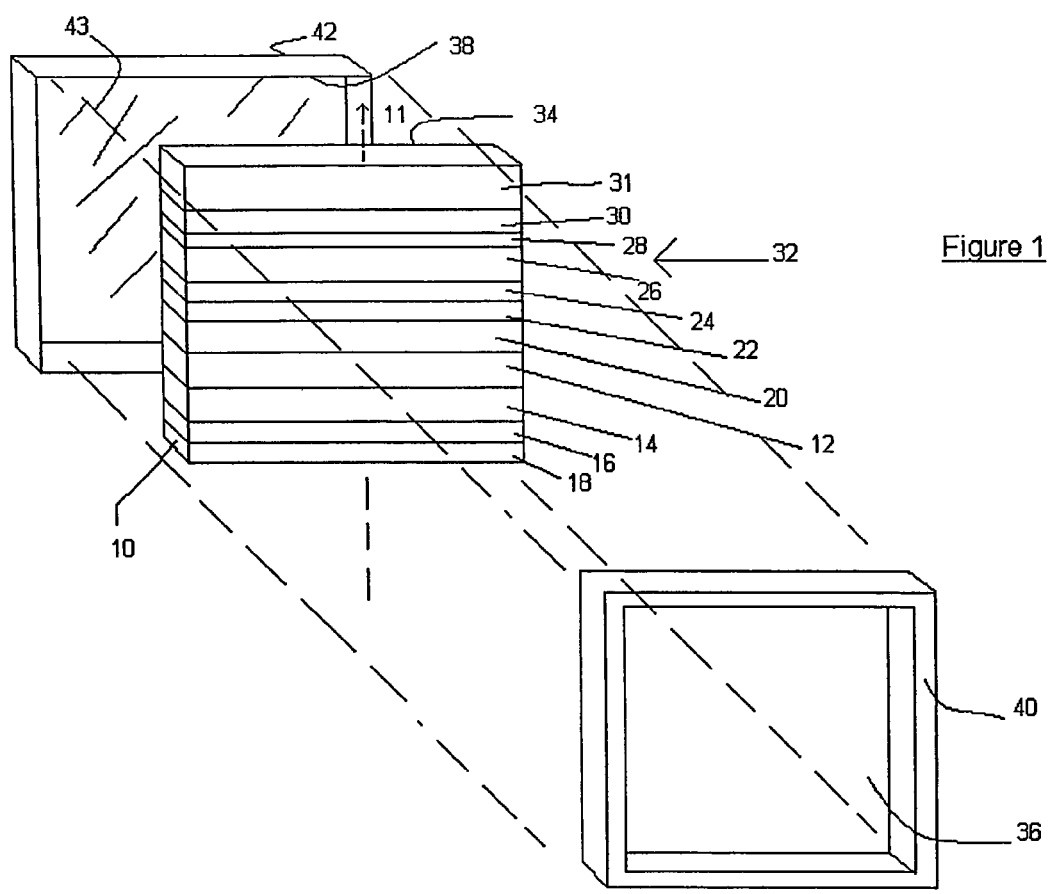
FIG. 1 depicts a front perspective view of a thin flat construction of the compact chemical reactor.
Figure 2:
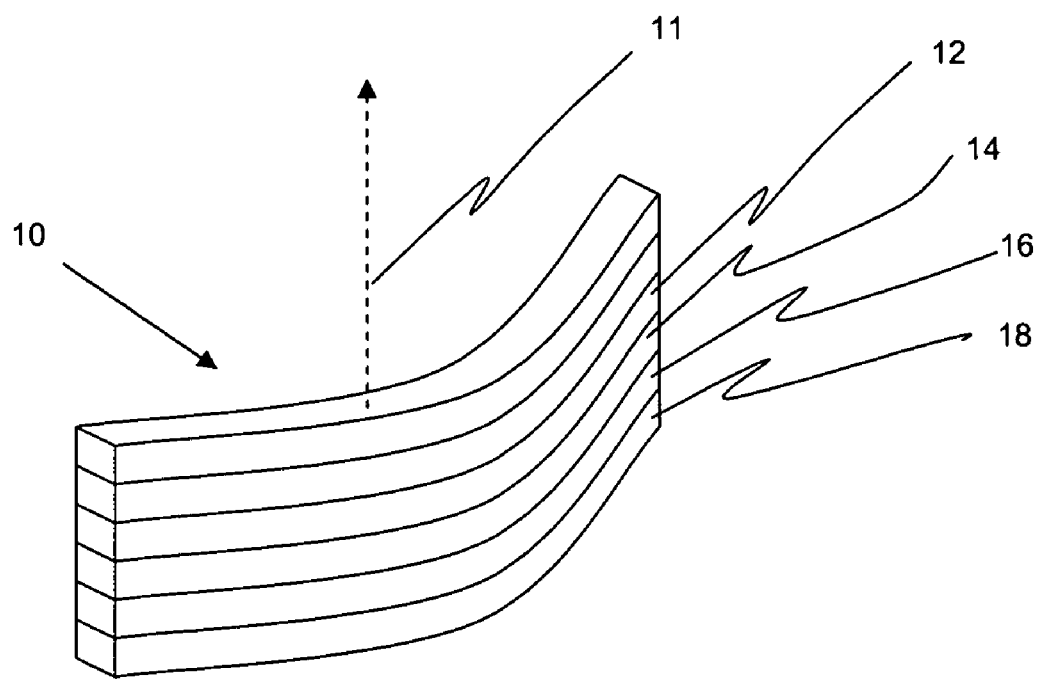
FIG. 2 depicts a front perspective view of a curvilinear construction of the compact chemical reactor.

With reference to the figures, FIG. 1 is a front perspective view of a compact chemical reactor. FIG. 1 depicts a thin flat construction embodiment of the compact chemical reactor. FIG. 2 depicts a thin curvilinear embodiment of the compact chemical reactor (10). Throughout the figures, the compact chemical reactor (10) is depicted having a central axis (11).

FIG. 1 shows a thin flat compact chemical reactor with 11 unit reactors. At least two unit reactors are needed to form the compact chemical reactor.

FIG. 2 shows a cylindrical version of a compact chemical reactor having at least 10 unit reactors and an overall diameter between about 1 centimeter and about 5 centimeters and a height between about 5 millimeters and about 80 millimeters.

The compact reactor (10), in any of the shape embodiments, can have a variable thickness. Variable thickness can mean that one individual unit reactor can be thicker than an adjacent unit reactor.

As an alternative to the embodiments depicted in FIG. 1 and FIG. 2, the compact chemical reactor (10) can be embodied in other shapes, such as a prismatic shape, a box-like shape or an irregular three dimensional shape. FIG. 1 depicts an embodiment of the compact chemical reactor (10) composed of a first unit reactor (12), a second unit reactor (14), and nine other unit reactors (16, 18, 20, 22, 24, 26, 28, 30, and 31).

The first and second unit reactors are disposed adjacent to each other and form a front side (32) and a back side (34). The front side (32) communicates with front reactant plenum (36); the back side (34) communicates with back reactant plenum (38).

The front reactant plenum (36) is enclosed by a structure (40). The structure (40) can either be a closed container or open to ambient atmosphere. FIG. 1 depicts an embodiment of the structure (40) open to ambient atmosphere. When the front reactant plenum is open to the atmosphere the enclosing structure (40) is optional. The structure (40), when open to the atmosphere, adds structural support to the front reactant plenum (36).

The back reactant plenum (38) is enclosed by a device (42) which is similar to structure (40). The device (42) can be a closed container or open to ambient atmosphere. When the device (42) is open to the atmosphere, the device (42) adds structural support to the back reactant plenum. FIG. 1 depicts an embodiment wherein the device (42) is a closed container with a solid back wall (43).

The compact chemical reactor (10) is constructed of a plurality of unit reactors. The design of the compact chemical reactor (10) can range from 2 unit reactors to about fifty thousand or more unit reactors to be adjoined to create the compact chemical reactor. Preferably, between two and five hundred unit reactors are used in the compact chemical reactor with a preferred embodiment of between two and one hundred unit reactors.

The unit reactors can be oriented to form or enclose the back reactant plenum (38).

Figure 3:
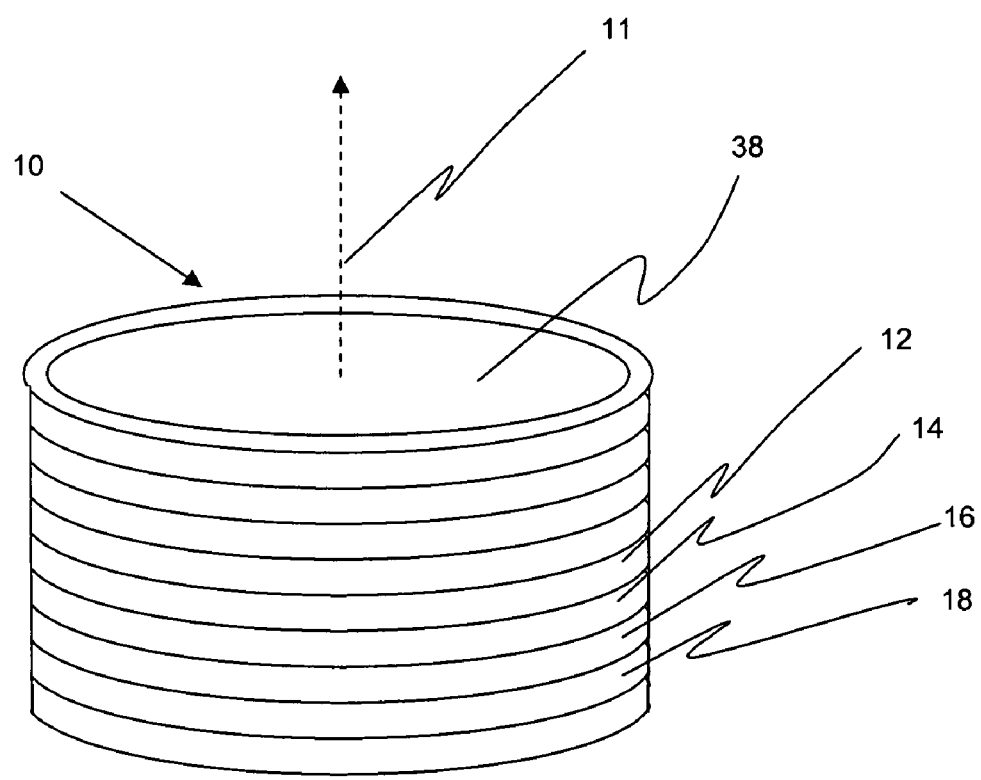
FIG. 3 depicts a front perspective view of the compact chemical reactor wherein the unit reactors enclosing the back reactant plenum are horizontally oriented.

The unit reactors can be disposed in various ways relative to each other. In the embodiment depicted in FIG. 3, the unit reactors are disposed roughly parallel to each other and then the unit reactors are disposed horizontally around the central axis (11). Also, the unit reactors enclose the back reactant plenum.

Figure 4:
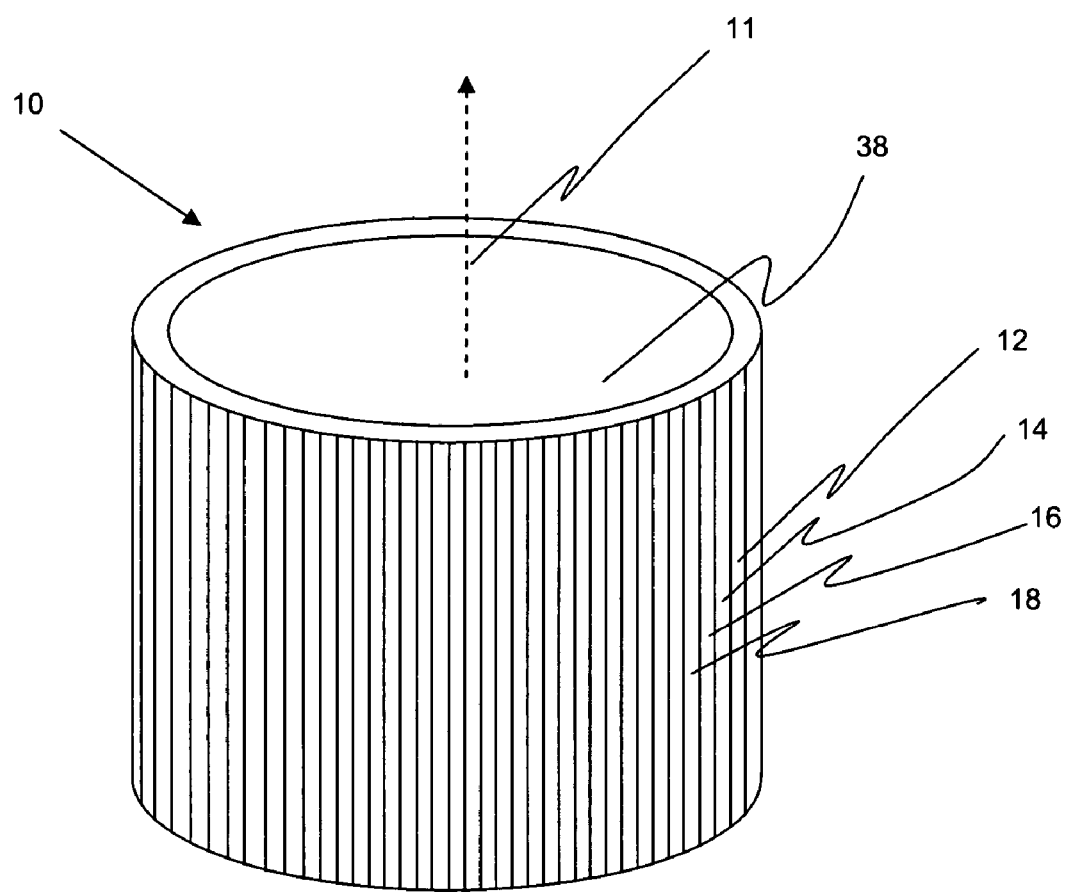
FIG. 4 depicts a front perspective view of the compact chemical reactor wherein the unit reactors enclosing the back reactant plenum are vertically oriented.

FIG. 4 depicts an embodiment wherein the unit reactors that enclose the back reactant plenum are disposed roughly parallel to each other and then the unit reactors are disposed parallel around the central axis.

Figure 5:
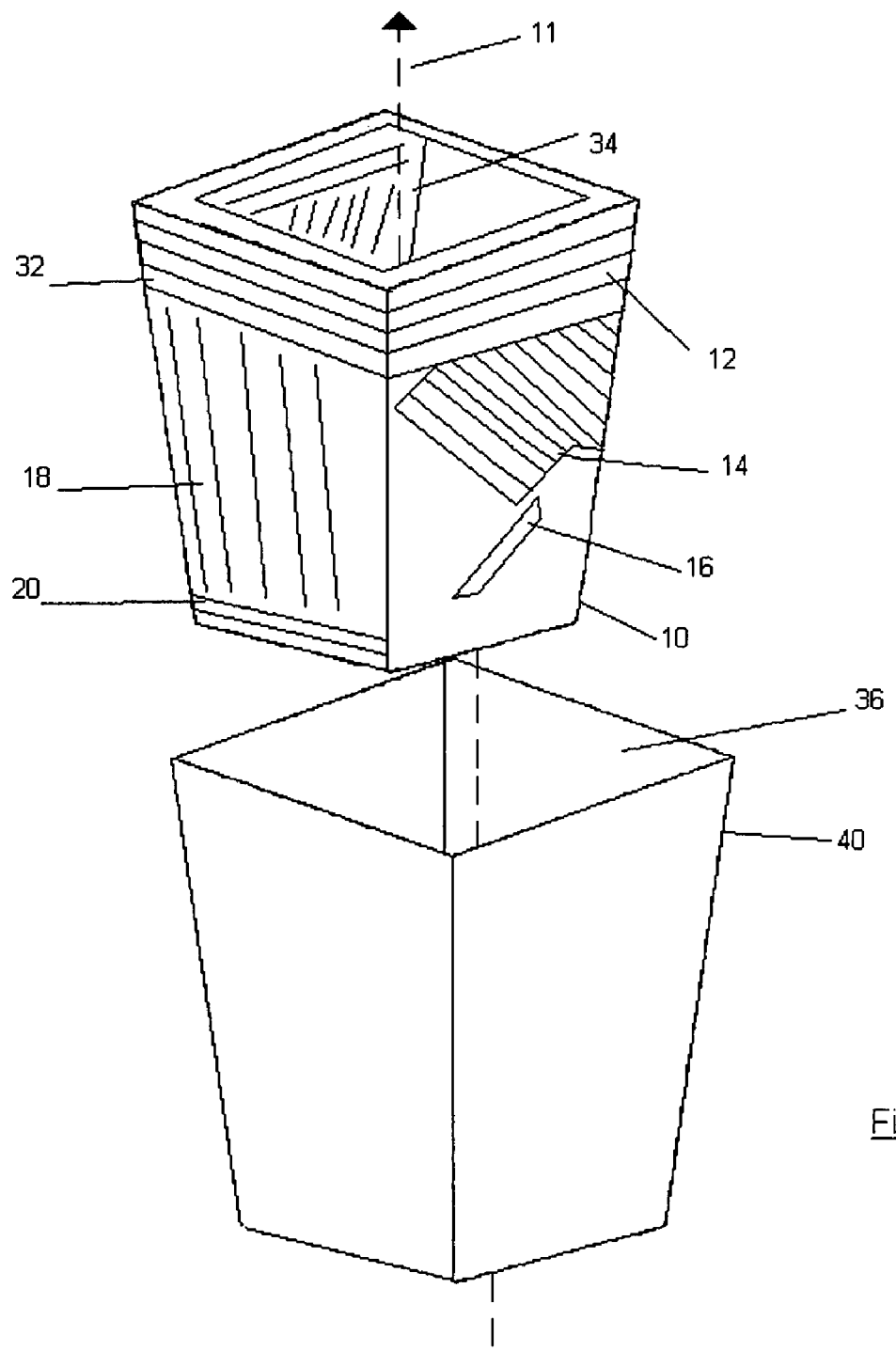
FIG. 5 depicts an exploded perspective view of the compact chemical reactor wherein the unit reactors are disposed in parallel at an arbitrary angle to the central axis of the compact chemical reactor.

FIG. 5 depicts an embodiment wherein the unit reactors are disposed roughly parallel with each other but at an arbitrary angle to the central axis of the compact chemical reactor. The unit reactors can be disposed in groups wherein the unit reactors are parallel to each other, and then each group can be disposed at an arbitrary angle to adjacent groups.

Figure 6:
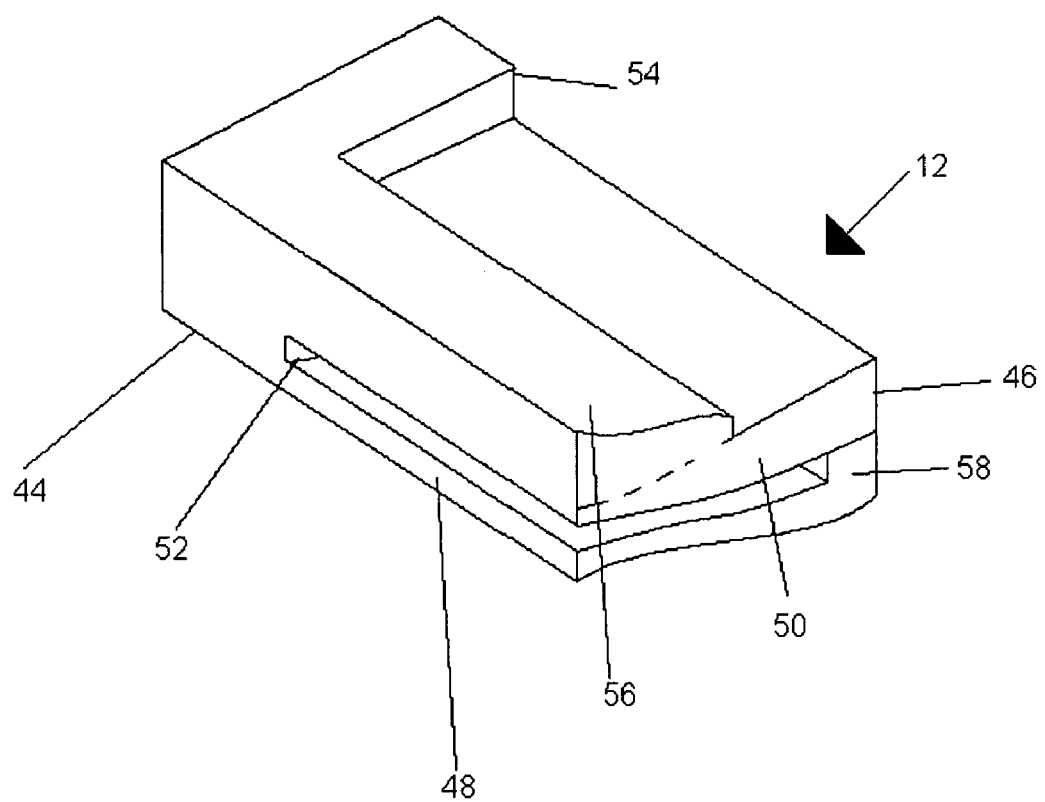
FIG. 6 depicts a cutaway perspective view of a unit reactor.

FIG. 6 depicts a cutaway perspective view of one embodiment of an individual unit reactor (12). The unit reactor has a front face (44) and a back face (46). The unit reactor comprises a front process layer (48), referred to herein as a first process layer, and a back process layer (50), referred to herein as a second process layer. The process layers (48 and 50) are shown in this embodiment as thin sheets with each process layer having, preferably, a thickness between about one nanometer and two centimeters. As an alternative, the one or more of the process layers can have a thickness different from another process layer.

The process layers can be made from a variety of materials. For example, the process layer material could be an electrolyte, an ion exchange membrane, a filtration membrane, a separation membrane, a micro-structured diffusion mixer, a heater, a catalyst, an electrical conductor, a thermal conductor, and combinations of these.

An example of a workable ion exchange membrane is Nafion™ available from E.I. DuPont DeNamours of Wilmington, Del. A usable separation membrane is Nafion™.

A microstructured diffusion mixer is available from Micronics of Seattle, Wash. The micro structured diffusion mixer typically serves to allow transport of liquid by diffusion without use of a separation membrane. Micro structured diffusion mixers have small channels. When liquid is pushed through the channels, the liquid reaches laminar flow. Typically, micro structured diffusion mixers are used for blood testing to prevent the mixing of blood with the test liquid but permit diffusion from one liquid to another.

An example of heater usable with the compact chemical reactor is a thin film resistive heater, such as those available from Omega, of Stamford, Conn.

Examples of catalysts useable with the compact chemical reactor include inorganic carbon catalysts, such as Novacarb™ from Mast Carbon of the United Kingdom. An electrical conductor contemplated for use in the compact chemical reactor is a thin film of metal, such as copper or a silver filled epoxy, such as model number TF12202 from Tech Film of Peabody, Mass. The usable thermal conductors can be metals, or thermally conductive epoxy adhesive films such as those also available from Tech Film.

Alternatively, each process layer can be made of a filled metal composite, a filled microstructure of polymer, filled porous polymer composite filled epoxy composite, graphite composite, or combinations of these materials. Filled metal composites can be a stainless steel filled with carbon, such as those available from Angstrom Power Inc. of Vancouver, Canada. Filled microstructures of polymers include Primea™ membrane available from Gore Industries of Elkton, Md. Filled epoxy composites include those available from Tech Film of Peabody, Mass. Graphite composites include Grafoil™ available from Graftech of Wilmington, Del.

The compact chemical reactor can have a first process layer that performs a different process from the second process layer.

Continuing with FIG. 6, each individual unit reactor has a front cavity (52) and a back cavity (54). The cavities (52 and 54) are formed between the front and back process layers (48 and 50). Each individual unit reactor includes a front perimeter barrier (56) and a back perimeter barrier (58). The front perimeter barrier (56) is located on the back process layer (50) substantially surrounding the back cavity (54). The front perimeter barrier (56) can optionally completely enclose the back cavity (54).

Likewise, the back perimeter barrier (58) can be located on the front process layer (48) substantially surrounding the front cavity (52). The back perimeter barrier (58) can optionally completely enclose the front cavity (52).

The unit reactors can be oriented so that the front perimeter barrier of each unit reactor connects to the front process layer of an adjacent unit reactor.

The perimeter barriers ensure that reactant from one reactant plenum does not migrate into another reactant plenum.

The perimeter barriers keep the reactant from migrating by either the material itself or the form of the perimeter barrier, or both form and material. Usable materials for the perimeter barriers can include metals, such as stainless steel; silicone, such as RTV™ available from Dow Corning of Midland, Mich.; rubber, such as those available from the Apple Rubber of Lancaster, N.Y.; polyamide, such as nylon available from DuPont of Wilmington, Del.; synthetic rubber, such as BUNA available from Dow Synthetic Rubber of Edegem Belgium; epoxy, such as those available from EPO Tech of Billerica, Mass.; polytetrafluoroethylene, also available as Teflon™; polyvinyldiflouride, known as Kynar™, available from Atofina Chemicals, Incorporated, of Philadelphia, Pa.; or composites thereof, laminates thereof, alloys thereof, and/or blends of these materials.

Usable forms for the perimeter barriers include microstructures or three-dimensional structures that create a tortuous path for the reactant.

The formed first and second cavities (52 and 54) allow the reactants to move from the plenums to the process layers. In a preferred embodiment, the only transport mechanism for the movement of reactants within the cavities is by diffusion. In an alternative embodiment, the diffusion can be aided by other transport mechanisms including convection and forced flow. The cavities can be filled with material or structured to aid in the distribution of reactants to the process layers. One or more of the cavities can be filled partially, or completely filled, with a material to aid in the transport of reactant, by-product of the reaction caused by the reactants, or transport of attributes of the reactant. The cavity can be filled with a catalyst to promote the function of the compact chemical reactor. A porous media, such as those available from Angstrom Power of Vancouver, Canada, can be used to partially or completely fill the cavities. In a preferred embodiment, the cavity is filled 100% with the porous media. The cavity can be filled with as little as 5% the porous media.

The transport process is the exchange of a reactant or property of a reactant between the reactant plenums. Examples of usable reactants include fuels, water, oxidants, beverages, liquid phase hydrocarbons, gas phase hydrocarbons, foodstuffs, by-products of the reaction and combinations of these materials. Fuels that could be used include hydrogen, hydrogen from reformate, ammonia, sodium borohydride or other chemical hydrides. Oxidants that could be used include oxygen, air, or means of generating oxygen such as hydrogen peroxide. Beverages that could be used as reactants include wine, juices, and other liquids with particulate. Liquid phase hydrocarbons that can serve as reactants include methanol, ethanol, butanol, and formic acid. Gas phase hydrocarbons include propane, butane, methane, and combinations of these. Foodstuffs that are usable include the whey of cheese products, chocolates based liquids, and other foodstuffs which are initially liquid and then solidify.

The transport process can move reactants and attributes of one of the reactants from one of the reactant plenums to the other reactant plenum.

Attributes within the scope of this application are the attributes of the reactant and include ionic charge (when used as a fuel cell), heat (when used as a heat exchanger), moisture content (when used as a humidifier), pressure (when used with a gas permeable membrane to allow gas to diffuse out of a liquid), concentration (when used to transport material from a substance having a first concentration to a substance with a different concentration), electrical charge, and other similar physical characteristics.

For example, the chemical reactor can move large amounts of heat from a first reactant plenum to a second reactant plenum. If this reactor is made as a heat exchanger having hot water at about 90 degrees Celsius on one side and cold water at about 20 degrees Celsius on the other side, the reactor can quickly perform a thermal transfer of hot into cold in a short time.

When used as a fuel cell, fuel is filled in one reactant plenum and oxidant in the other. The fuel and oxidant are able to be transported to be in contact with the process layers. The process layers have anodes and cathodes by filling the cavities with electrochemically active materials. Electricity is produced by the fuel cell reactant and is transported out of the fuel cell through conductive paths in the layer structure. Water and heat are produced as biproducts of the reaction. The water is transported out of the cavities back into the reactant plenum and heat dissipates through the physical structure.

When used as an electrolyzer, anodes and cathodes are formed on either side of some of the process layers by at least partially filling the cavities with electrochemically active materials. Water is used to fill reactant plenums and is transported into the electrolyzer to come into contact with the anodes and cathodes at the process layers. The electrolysis reaction uses electrical energy to decompose water into water's constituent elemental components, i.e. hydrogen and oxygen. The constituent elemental components are formed at the electrodes and then are transported back into the reactant plenums by convection, diffusion, pressure gradients or a variety of other transport processes.

The compact chemical reactor can be formed in to a micro-structured fuel cell layer or a micro-structured electrolyzer layer.

Figure 7:
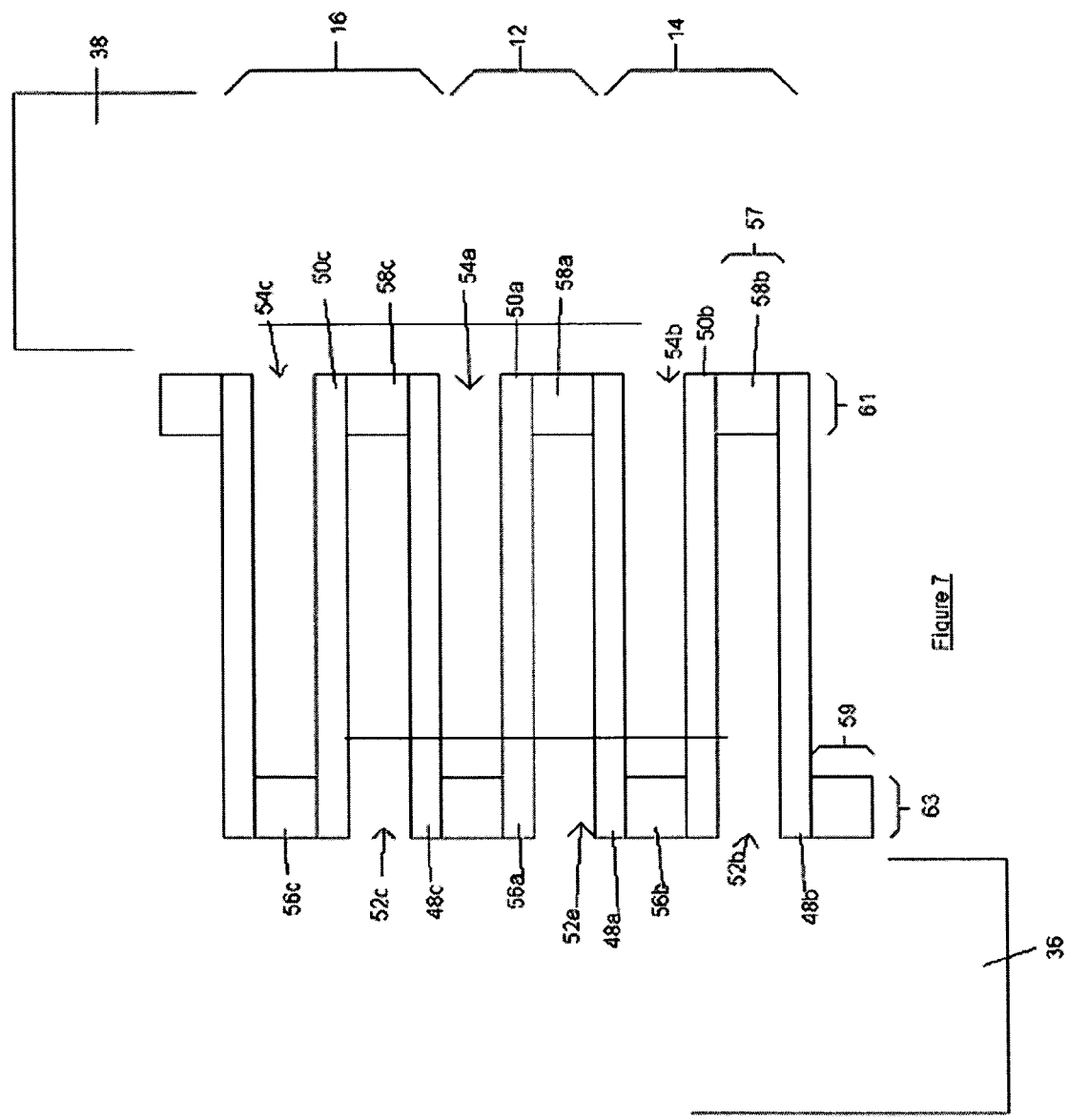
FIG. 7 depicts a cross-sectional schematic of a group of unit reactors stacked sequentially.

FIG. 7 depicts a cross-sectional schematic of a group of unit reactors (12, 14, and 16) stacked sequentially. Each unit reactor has a front process layer (48a, 48b, and 48c) and a back process layer (50a, 50b, and 50c). The front cavities (52a, 52b, and 52c) are formed between the corresponding front and back process layers. Likewise, the back cavities (54a, 54b, and 54c) are formed by corresponding front and back process layers. Each individual unit reactor includes a first front perimeter barrier (56a), a second front perimeter barrier, (56b) a third front perimeter barrier (56c), a first back perimeter barrier (58a), a second back perimeter barrier (58b) and a third back perimeter barrier (58c). FIG. 7 depicts the orientation of these parts when the unit reactors are stacked. The adjacent unit reactors connect adjacent front perimeter barriers and front process layers in this stacked embodiment.

FIG. 7 also shows that the perimeter barriers used on the process layers of the unit reactors have dimensions of height and width. The front and back perimeter barriers (57 and 59) have a preferred height dimension ranging from about 100 nanometers to about 10 millimeters. The front and back perimeter barriers (61 and 63), respectively, have a preferred width dimension ranging from about 10 nanometers to about 5 millimeters. In still another embodiment, the front and back perimeter barrier widths can vary.

The compact chemical reactor assembled provides high surface area process layers that are in communication with the reactant plenums through the front or back cavities. The front or back cavities have high aspect ratios, wherein the distance from the front or back face to the opposite side of the cavity is much larger than the height of the front or back perimeter barrier.

A typical compact chemical reactor is preferably made wherein the aspect ratio of at least one cavity is greater than 1 cm/cm, more preferably between 1 cm/cm and 100 cm/cm and most preferably between 2.5 cm/cm and 15 cm/cm.

A typical compact chemical reactor has an overall length between about 1 centimeter to about 100 centimeters, 1 centimeter to 10 centimeters in a preferred embodiment.

An overall width of the chemical reactor is between about 1 millimeter to about fifty centimeters, with 5 millimeters to 80 millimeters in a preferred embodiment. An overall thickness between the front face and the back face of the compact chemical reactor is between about 100 nanometers to about 5 centimers.

Figure 8:
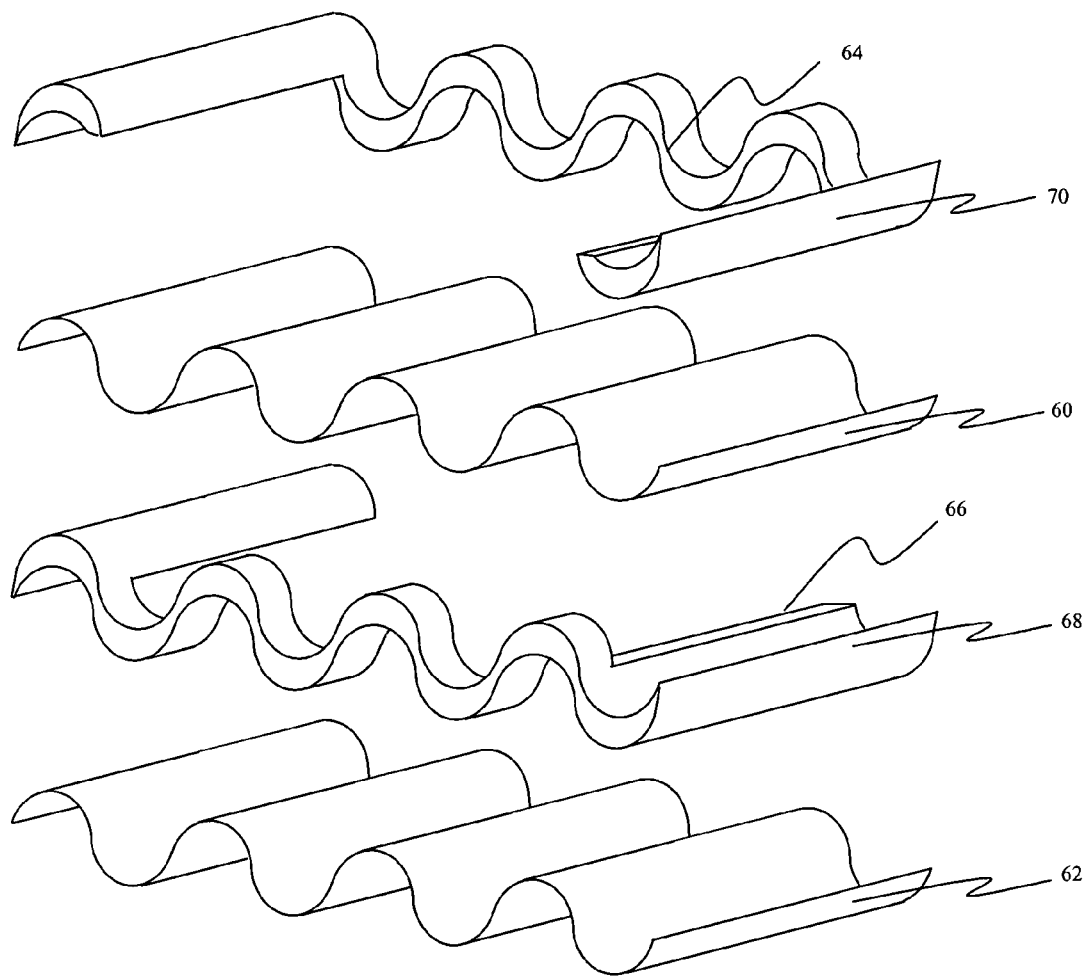
FIG. 8 depicts an exploded perspective view of an undulating unit reactor.

FIG. 8 depicts an exploded perspective view of an undulating unit reactor.

An embodiment of the compact chemical reactor can be wherein the process layers are undulating front and back process layers (60 and 62) as depicted in FIG. 8. The front cavity is an undulating front cavity (64) and the back cavity is an undulating back cavity (66), the front perimeter barrier is an undulating front perimeter barrier (68), and the back perimeter barrier is an undulating back perimeter barrier (70). Undulating in the context of this application refers to non-planar process layers, such as layers which are sinusoidal in shape, or arcs, or irregular in some other manner. Some of the process layers can be undulating while the remaining process layers can be planar and still form a usable compact chemical reactor.

The compact chemical reactor can be a fuel cell layer formed from multiple unit reactors, each of which is a unit fuel cell.

Figure 9:
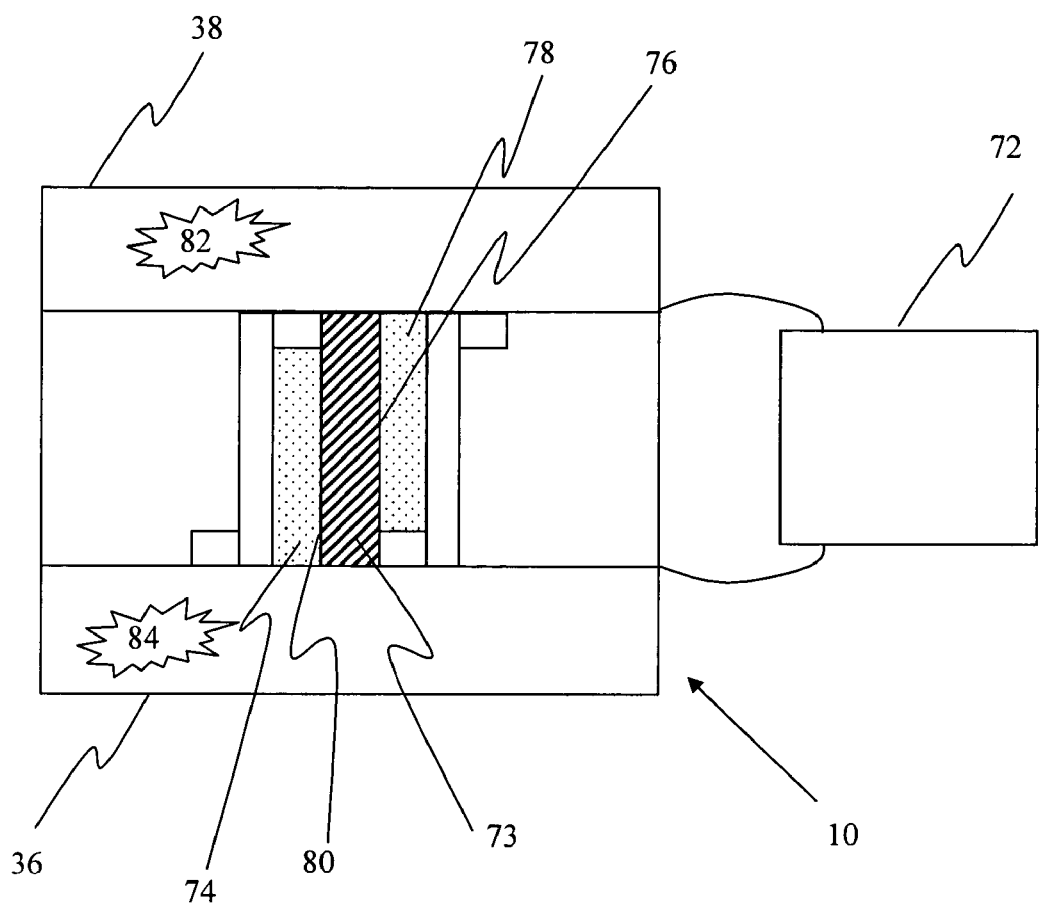
FIG. 9 depicts a cross sectional schematic of an electrical appliance on a fuel cell system using the output of the compact chemical reactor.

FIG. 9 depicts an embodiment wherein the compact chemical reactor forms a fuel cell and is used in conjunction with an electrical appliance (72).

The electrical appliance (72) uses the compact chemical reactor (10) as a source of electrical power, that is, as a fuel cell. The unit fuel cells each comprise one or more process layers of electrolyte (73). One or more of the cavities include a first catalyst (74) forming at least one anode (80). One or more other cavities include a second catalyst (78) forming at least one cathode (76). The anode (80) and the cathode (76) are disposed on either side of the electrolyte (73). One of the reactant plenums contains an oxidant (82), such as oxygen, and one reactant plenums contain a fuel (84), such as hydrogen. The anode (80) and the cathode (76) connect to the electrical appliance (72) and provide power.

As a fuel cell, at least one process layer must be an ionically conductive process layer in order to facilitate the transport of ions. Optionally, at least one process layer may be made an electronically conductive process layer to transport electrons between unit reactors. An ionically conductive process layer can be made from a proton exchange membrane, an electrolyte filled micro-porous structure, a liquid electrolyte trapped in a mesh, and combinations thereof. An electronically conductive process layer can be made from an electrical conductor, a filled metal composite, a filled microstructure of polymer, a filled epoxy composite, a graphite composite, or combinations thereof.

The embodiments have been described in detail with particular reference to certain preferred embodiments thereof, but it is to be understood that variations and modifications can be effected within the scope of the embodiments, especially to those skilled in the art.

What is claimed is:

1. A compact chemical reactor with a central axis, comprising:
    a. at least a first unit reactor and a second unit reactor, wherein the first and second unit reactors are disposed adjacent each other to form a front side and a back side of the compact chemical reactor;
    b. a front reactant plenum communicating with the front side;
    c. a back reactant plenum communicating with the back side, wherein at least one of the reactant plenums comprises a reactant; and
    d. wherein each unit reactor comprises a front face and a back face and further each unit reactor comprises:
        i. a first process layer;
        ii. a second process layer;
        iii. a front cavity formed between the first and second process layers;
        iv. a back cavity formed between the second process layer and a first process layer of an adjacent unit reactor;
        v. a front perimeter barrier disposed on the second process layer substantially surrounding the back cavity;
        vi. a back perimeter barrier disposed on the first process layer substantially surrounding the front cavity; and
        vii. wherein the front cavity is in communication with the front side, the back cavity is in communication with the back side, and wherein at least one of the process layers facilitates a transport process between the reactant plenums.

2. The reactor of claim 1, wherein the transport process is the exchange of reactant between the reactant plenums.

3. The reactor of claim 2, wherein the reactant comprises: a fuel, an oxidant, water, hydrogen, oxygen, air, a liquid phase hydrocarbon, a gas phase hydrocarbon, a beverage, a foodstuff, a byproduct from reaction of reactants, and combinations thereof.

4. The reactor of claim 1, wherein the transport process moves an attribute of the reactant from one of the reactant plenums to the other reactant plenum.

5. The reactor of claim 4, wherein the attribute is heat, moisture content, pressure, concentration, ionic charge, or electrical charge.

6. The reactor of claim 1, wherein the front perimeter barrier completely encloses the back cavity.

7. The reactor of claim 1, wherein the back perimeter barrier completely encloses the front cavity.

8. The reactor of claim 1, wherein the compact chemical reactor comprises a thin flat construction.

9. The reactor of claim 1, wherein the compact chemical reactor comprises a thin curvilinear construction.

10. The reactor of claim 1, wherein the unit reactors are disposed parallel to each other horizontally around the central axis.

11. The reactor of claim 1, wherein the unit reactors are disposed parallel to each other and parallel around the central axis.

12. The reactor of claim 1, wherein at least one unit reactor is disposed at a different angle to an adjacent unit reactor.

13. The reactor of claim 1, wherein the unit reactors are formed into groups of parallel unit reactors and each group is disposed at an arbitrary angle to an adjacent group.

14. The reactor of claim 1, wherein the overall length of the compact chemical reactor is between 1 centimeter and 100 centimeters, the overall width of the compact chemical reactor is between 1 millimeter and 50 centimeters, and the overall thickness between the front face and the back face of the compact chemical reactor is between 100 nanometers and 5 centimeters.

15. The reactor of claim 1, wherein the compact chemical reactor comprises a three dimensional shape selected from the group consisting of a cylinder, a prismatic shape, a box-like shape, and an irregular shape.

16. The reactor of claim 1, wherein at least one of the first and second unit reactors are oriented to form the back reactant plenum.

17. The reactor of claim 1, wherein the first and second unit reactors surround the back reactant plenum and conform to the shape of the back reactant plenum.

18. The reactor of claim 1, wherein the front reactant plenum is enclosed by a structure.

19. The reactor of claim 18, wherein the structure is open to ambient atmosphere.

20. The reactor of claim 18, wherein the structure is a closed container.

21. The reactor of claim 1, wherein the back reactant plenum is enclosed by a device.

22. The reactor of claim 21, wherein the device is open to ambient atmosphere.

23. The rector of claim 21, wherein the device is a closed container.

24. The reactor of claim 1, wherein more than two unit reactors are used in the compact chemical reactor.

25. The reactor of claim 1, wherein the compact chemical reactor comprises between 2 unit reactors and 500,000 unit reactors.

26. The reactor of claim 1, wherein the compact chemical reactor comprises between 2 unit reactors and 500 unit reactors.

27. The reactor of claim 1, wherein the compact chemical reactor comprises between 2 unit reactors and 100 unit reactors.

28. The reactor of claim 1, wherein at least one process layer comprise an electrolyte, an ion exchange membrane, an electrolysis membrane, a filtration membrane, a separation membrane, a micro-structured diffusion mixer, a heater, a catalyst, an electrical conductor, a thermal conductor, and combinations thereof.

29. The reactor of claim 1, wherein each process layer comprises a filled metal composite, a filled microstructure of polymer, a filled epoxy composite, a graphite composite, or combinations thereof.

30. The reactor of claim 1, wherein one of the process layers performs a function different from the function of the other process layer.

31. The reactor of claim 1, wherein at least one cavity is at least partially filled with a material to aid in the transport of reactant, transport of attributes of reactant, or transport of by-products of the reaction at the process layers.

32. The reactor of claim 1 wherein at least one cavity is at least partially filled with a catalyst to promote the function of the compact chemical reactor.

33. The reactor of claim 1, wherein each perimeter barrier comprises a material that prevents reactant from one reactant plenum from moving into the other reactant plenum.

34. The reactor of claim 33, wherein the material comprises a metal, a silicone, a rubber, a polyamide, a synthetic rubber, an epoxy, polytetrafluoroethylene, polyvinyldiflouride, composites of thereof, laminates thereof, alloys thereof, and blends thereof.

35. The reactor of claim 1, wherein each perimeter barrier comprises a structural form that prevents reactant from one reactant plenum from moving into the other reactant plenum.

36. The reactor of claim 35, wherein the structural form comprises a microstructure or a three dimensional structure creating a tortuous path.

37. The reactor of claim 1, wherein the process layers comprise at least one thin sheet.

38. The reactor of claim 37, wherein at least one of the thin sheet comprises a thickness between 1 nanometer and 2 centimeters.

39. The reactor of claim 1, wherein at least one process layer comprises a thickness different from another process layer.

40. The reactor of claim 1, wherein the transport of reactant from plenum to process layers is by diffusion.

41. The reactor of claim 1, wherein at least one cavity has an aspect ratio greater than 1 cm/cm.

42. The reactor of claim 41, wherein at least one cavity has an aspect ratio between 1 cm/cm and 100 cm/cm.

43. The reactor of claim 41, wherein at least one cavity has an aspect ratio between 2.5 cm/cm and 15 cm/cm.

44. The reactor of claim 1, wherein at least two cavities have different aspect ratios.

45. The reactor of claim 1, wherein the front and back perimeter barrier each comprise a height ranging from 100 nanometers to 10 millimeters and a width ranging from 10 nanometers to 5 millimeters.

46. The reactor of claim 1, wherein each front and back perimeter barrier comprises a width which can vary from being narrower on one portion of the perimeter barrier to wider on another portion of the perimeter barrier.

47. The reactor of claim 1, wherein at least one first process layer is an undulating first process layer, at least one second process layer is an undulating second process layer, at least one front cavity is an undulating front cavity, at least one back cavity is an undulating back cavity, at least one front perimeter barrier is an undulating front perimeter barrier, and at least one back perimeter barrier is an undulating back perimeter barrier.

48. The reactor of claim 1, wherein the compact chemical reactor forms a micro-structured fuel cell layer.

49. The reactor of claim 1, wherein the compact chemical reactor forms a micro-structured electrolyzer layer.

50. The reactor of claim 1, wherein the process layer is formed from two or more thin process layers that are placed in contact with each other. Applicant believes no new matter has been added with these amendments.

* * * * *

UNITED STATES PATENT AND TRADEMARK OFFICE
CERTIFICATE OF CORRECTION

PATENT NO. : 7,052,795 B2
APPLICATION NO. : 10/818780
DATED : May 30, 2006
INVENTOR(S) : Gerard Francis McLean, Duhane Lam and Olen Richard Vanderleeden It is certified that error appears in the above-identified patent and that said Letters Patent is hereby corrected as shown below:

Title Page item 57 lines 3 & 4
Abstract; change "front and back process layer" to "first and second process layer"

Specification; Column 1, Line 17, change "difficultly" to "difficulty"

Specification; Column 1, Line 51, change "than" to "from that"

Specification; Column 1, Line 65, change "front and back process layer" to "first and second process layer"

Specification; Column 3, Line 1, change "FIG 2" to "FIG 3"

Specification; Column 4, Line 6, change "As an alternative, the one or more of the process layers can have a thickness different from another process layer." to "The process layers within a unit reactor can have the same thickness or can have different thicknesses."

Specification; Column 4, Line 18, change "microstructured" to "micro structured"

Specification; Column 4, Line 41, insert --,-- between "composite" and "filled"

Specification; Column 4, Line 56, change "front and back" to "first and second"

Specification; Column 4, Line 59, change "back process layer" to "second process layer"

Specification; Column 4, Line 64, change "front process layer" to "first process layer"

Specification; Column 5, Line 2, change "front process layer" to "first process layer"

Specification; Column 5, Line 16, insert --,-- between "Edegem" and "Belgium"

Specification; Column 6, Line 41, change "front process layer" to "first process layer"

UNITED STATES PATENT AND TRADEMARK OFFICE
CERTIFICATE OF CORRECTION

PATENT NO.      : 7,052,795 B2
APPLICATION NO. : 10/818780
DATED           : May 30, 2006
INVENTOR(S)     : Gerard Francis McLean, Duhane Lam and Olen Richard Vanderleeden It is certified that error appears in the above-identified patent and that said Letters Patent is hereby corrected as shown below:

Specification; Column 6, Line 42, change "back process layer" to "second process layer"

Specification; Column 6, Line 44, change "front and back process layers" to "first and second process layers"

Specification; Column 6, Line 45, replace "are formed by corresponding front and back process layers. Each individual unit reactor includes a first front perimeter barrier (56a), a second front perimeter barrier (56b), a third front perimeter barrier (56c), a first back perimeter barrier (58a), a second back perimeter barrier (58b) and a third back perimeter barrier (58c)." with "between the corresponding second process layer and the first process layer of the next unit reactor. Each individual unit reactor includes a front perimeter barrier (56a, 56b, and 56c) and a back perimeter barrier (58a, 58b, and 58c)."

Specification; Column 6, Line 56, insert --(57 and 59)-- after "height"

Specification; Column 6, Line 57, insert --(61 and 63)-- after "width"

Specification; Column 6, Line 57, remove "(57 and 59)"

Specification; Column 6, Line 60, replace ". The front and back perimeter barriers (61 and 63), respectively, have" with "and"

Specification; Column 6, Line 62, remove "still"

Specification; Column 7, Line 11, replace "between" with "from"

Specification; Column 7, Line 15, replace "between" with "from"

Specification; Column 7, Line 20, remove "front and back" after "undulating"

Specification; Column 7, Line 42, replace "catalyst (74)" with "catalyst (80)"

Specification; Column 7, Line 42, replace "anode (80)" with "anode (74)"

Specification; Column 7, Line 43, replace "catalyst (78)" with "catalyst (76)"

Specification; Column 7, Line 44, replace "cathode (76)" with "cathode (78)"

UNITED STATES PATENT AND TRADEMARK OFFICE
CERTIFICATE OF CORRECTION

PATENT NO. : 7,052,795 B2
APPLICATION NO. : 10/818780
DATED : May 30, 2006
INVENTOR(S) : Gerard Francis McLean, Duhane Lam and Olen Richard Vanderleeden It is certified that error appears in the above-identified patent and that said Letters Patent is hereby corrected as shown below:

Specification; Column 7, Line 44, replace "anode (80) and the cathode (76)" with "anode (74) and the cathode (78)"

Specification; Column 7, Line 48, replace "anode (80) and the cathode (76)" with "anode (74) and the cathode (78)"

Specification; Column 7, Line 52, replace "Optionally, at" with "At"

Claims; Column 9, Line 42, replace "and" with "or"

Claims; Column 9, Line 44, replace "each" with "at least one"

Claims; Column 10, Line 5, replace "and" with "or"

Claims; Column 10, Line 16, change "thin sheet comprises" to "thin sheets has"

Claims; Column 10, Line 19, change "comprises" to "has"

Claims; Claim 10, Line 31, change "comprise" to "have"

Claims; Claim 10, Line 36, change "comprises" to "has"

Signed and Sealed this

Seventh Day of July, 2009

JOHN DOLL
*Acting Director of the United States Patent and Trademark Office*